(12) United States Patent
Smerzi (10) Patent No.: US 11,237,077 B2
(45) Date of Patent: Feb. 1, 2022

(54) STRESS SENSOR, STRUCTURAL HEALTH MONITORING SYSTEM FOR CONSTRUCTIONS AND PROCESS FOR MANUFACTURING A STRESS SENSOR

(71) Applicant: STMICROELECTRONICS S.R.L., Agrate Brianza (IT)

(72) Inventor: Santo Alessandro Smerzi, Catania (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 385 days.

(21) Appl. No.: 16/353,965

(22) Filed: Mar. 14, 2019

(65) Prior Publication Data
US 2019/0285509 A1   Sep. 19, 2019

(30) Foreign Application Priority Data

Mar. 16, 2018 (IT) .................. 102018000003693

(51) Int. Cl.
| | |
|---|---|
| *G01M 5/00* | (2006.01) |
| *G01L 1/18* | (2006.01) |
| *G01L 5/162* | (2020.01) |

(52) U.S. Cl.
CPC ............. *G01M 5/0041* (2013.01); *G01L 1/18* (2013.01); *G01L 5/162* (2013.01)

(58) Field of Classification Search
None
See application file for complete search history.

(56) References Cited

U.S. PATENT DOCUMENTS

| | | | | |
|---|---|---|---|---|
| 4,703,663 | A  * | 11/1987 | Oppermann | ........... G01L 9/0002 |
| | | | | 73/862.68 |
| 7,430,920 | B2 * | 10/2008 | Sumigawa | ............... G01B 7/16 |
| | | | | 73/727 |
| 2005/0160814 | A1 | 7/2005 | Vaganov et al. | |
| 2007/0090536 | A1 | 4/2007 | Sakai et al. | |
| 2011/0046452 | A1 | 2/2011 | Najafi et al. | |
| 2011/0227178 | A1* | 9/2011 | Kazama | .................... G01L 1/18 |
| | | | | 257/417 |
| 2011/0303993 | A1 | 12/2011 | Yamamoto | |
| 2017/0108390 | A1* | 4/2017 | Shimokawa | ............. G01L 19/04 |

(Continued)

OTHER PUBLICATIONS

Barrias et al., "A Review of Distributed Optical Fiber Sensors for Civil Engineering Applications," *Sensors* 16(5): 2016, 35 pages.

(Continued)

*Primary Examiner* — Andre J Allen
*Assistant Examiner* — Jermaine L Jenkins
(74) *Attorney, Agent, or Firm* — Seed IP Law Group LLP (57) ABSTRACT

A stress sensor includes: a substrate, having a face and a recess, open to the face; and a sensor chip of semiconductor material, housed in the recess and bonded to the substrate, the sensor chip being provided with a plurality of sensing components of piezoresistive material. The substrate has a thickness which is less by at least one order of magnitude with respect to a main dimension of the face. Further, the sensor chip has a thickness which is less by at least one order of magnitude with respect to the thickness of the substrate, and a Young's module of the substrate and a Young's module of the sensor chip are of the same order of magnitude.

22 Claims, 6 Drawing Sheets

(56) References Cited

U.S. PATENT DOCUMENTS

2017/0234753 A1 8/2017 Pavone
2017/0331429 A1* 11/2017 Motz .................... H03B 1/00

OTHER PUBLICATIONS

Comite Euro-International du Beton, "CEB-FIP Model Code 1990," Thomas Telford Services Ltd., London, United Kingdom, 1991, 462 pages.
Geokon, "Instruction Manual Model 4370 Concrete Stressmeter," Geokon, Inc., Doc Rev F, Jun. 2015, 17 pages.
Instrumentation Devices Srl, "Estensimetri e Accessori per l'analisi sperimentale delle sollecitazioni," Revision No. 150618, 56 pages.
Instrumentation Devices Srl, "Strain gauges and accessories analysis for experimental stress," Revision No. 150618, 81 pages (machine generated English translation).
Jurków et al., "Overview on low temperature co-fired ceramic sensors," *Sensors and Actuators A: Physical* 233:125-146, 2015.
Laube et al., Concrete Stress Measurement—Device and Applications, IMEKO publications, *VDI BERICHTE* 1685: 121-128, 2002.
Monaco, "La viscositá nelle strutture in calcestruzzo armato," Universita' del Salento Dipartimento di Ingegneria Dell'innovazione, Jun. 2012, 55 pages.
Monaco, "The viscosity in reinforced concrete structures," Universita' del Salento Dipartimento di Ingegneria Dell'innovazione, Jun. 2012, 71 pages, (machine generated English translation).
Tanabe et al. (eds.) *Creep, Shrinkage and Durability Mechanics of Concrete Structures*, Taylor and Francis, London, United Kingdom, Kurata et al., "Study on measurement of concrete stress in structural members by effective stress meter," pp. 293-297, 2009.

* cited by examiner

STRESS SENSOR, STRUCTURAL HEALTH MONITORING SYSTEM FOR CONSTRUCTIONS AND PROCESS FOR MANUFACTURING A STRESS SENSOR

BACKGROUND

Technical Field

The present disclosure relates to a stress sensor, to a structural health monitoring system for constructions, and to a process for manufacturing a stress sensor. The stress sensor is particularly suited to being used for structural health monitoring of materials that have a viscoelastic behavior, such as concrete.

Description of the Related Art

As is known, structural health monitoring (SHM), in particular for constructions of concrete, may use of sensors of various nature, such as pressure sensors, strain gauges, temperature sensors, and so forth. The sensors are connected in communication with a monitoring station, where the measurements made are monitored, analyzed, and stored.

Some of the sensors, for example pressure sensors and/or strain gauges, may be embedded in the concrete in reference positions in order to keep under control the state of stress of the material. Some of the pressure sensors currently available to be embedded in concrete may be provided by regions of piezoresistive material deposited on a membrane or substrate that may undergo deformations as a result of the pressure applied. The regions of piezoresistive material may be provided directly on the membrane using thick-film screen-printing techniques and may be connected in a Wheatstone-bridge configuration.

Other sensors that may be used are optical fibers with optical properties that depend upon the state of the mechanical stresses, and stress meters that employ load cells connected to specimens of concrete separated from the rest of the structure by tubular sleeves.

Known sensors present, however, certain limitations, that depend in part upon difficulties and problems in use and in part upon the viscoelastic behavior of concrete.

The relations between stresses and strains in viscoelastic materials such as concrete are determined by various non-linear components, some of which depend upon time and are non-reversible or only partially reversible. For various well-known phenomena, in fact, in given conditions the deformations may vary, even though the load applied is not modified, or, conversely, following upon removal of a load, the strains are recovered only in part or are not recovered at all. On account of this complex behavior of the material, the sensors are markedly affected by local strains and stresses that do not depend upon the loads applied from outside. In practice, the response of the sensors depends not only upon the load applied, but also upon the state of the material and thus may not be reliable.

BRIEF SUMMARY

One or more embodiments of the present disclosure provide a stress sensor, a structural health monitoring system for constructions, and a process for manufacturing a stress sensor that will enable the limitations described above to be overcome or at least mitigated.

According to the present disclosure a stress sensor, a structural health monitoring system for constructions, and a process for manufacturing a stress sensor are provided.

BRIEF DESCRIPTION OF THE SEVERAL VIEWS OF THE DRAWINGS

For a better understanding of the disclosure, some embodiments thereof will be now described, purely by way of non-limiting example and with reference to the attached drawings, wherein.

DETAILED DESCRIPTION

Figure 1:
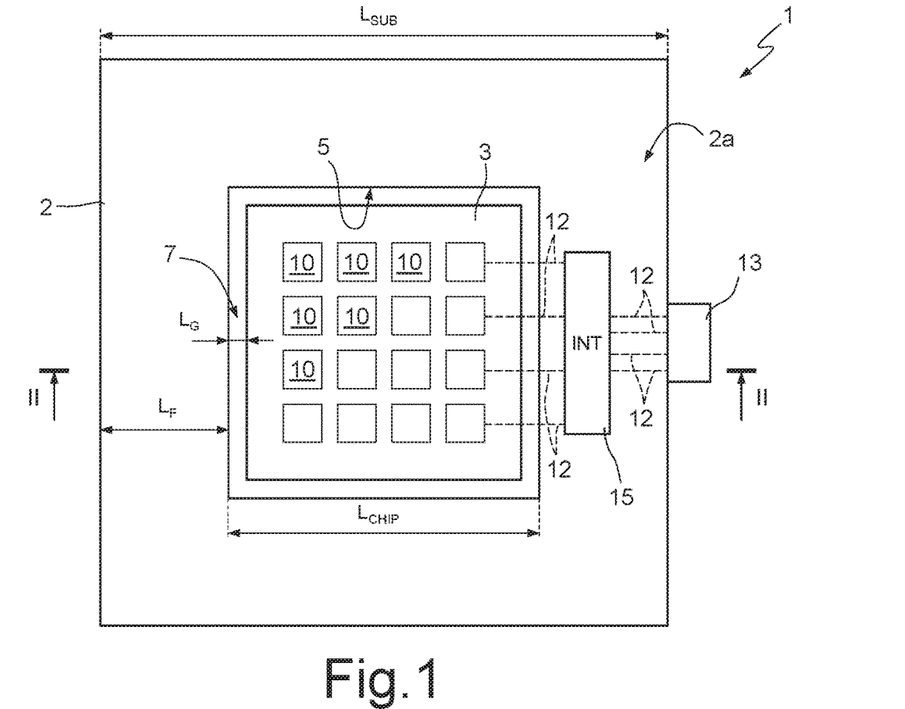
FIG. 1 is a top plan view of a stress sensor according to one embodiment of the present disclosure.
Figure 2:
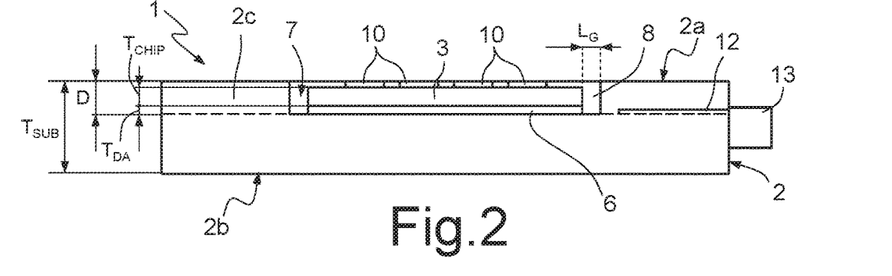
FIG. 2 is a cross-sectional view through the stress sensor of FIG. 1, taken along the line II-II of FIG. 1.

With reference to FIGS. 1 and 2, the number 1 designates as a whole a stress sensor according to an embodiment of the present disclosure. The stress sensor 1 comprises a substrate 2 and a sensor chip 3, which is of semiconductor material and is affixed to the substrate 2. The substrate 2 is of a material having a longitudinal elastic modulus (or Young's modulus) similar to, for example of the same order of magnitude as, the Young's modulus of the semiconductor material forming the sensor chip 3. In one embodiment, the substrate 2 may be an LTCC (Low-Temperature Co-fired Ceramic) multilayer, having a Young's modulus $E_{SUB}$=120 GPa, and the sensor chip 3 may be of silicon, with a Young's modulus $E_{CHIP}$=130 GPa. The Young's modulus $E_{SUB}$ of the substrate 2 and the Young's modulus $E_{CHIP}$ of the sensor chip 3 are both higher than the Young's modulus $E_C$ of the material forming the structure to be monitored. For instance, for concrete the Young's modulus $E_C$ is approximately 30 GPa. The substrate 2 is a thin, substantially planar plate having a first face 2a and a second face 2b with a main dimension $L_{SUB}$. The substrate 2 may, for example and not exclusively, have a square, rectangular, or circular shape. In these cases, the main dimension $L_{SUB}$ may, respectively, be the side, the minor side, or the diameter of the faces 2a, 2b. In general, by "main dimension" $L_{SUB}$ is meant the minimum distance between two points of the perimeter of the first face 2a or of the second face 2b opposite with respect to their geometrical center. A thickness $T_{SUB}$ of the substrate 2 is much smaller than the main dimension $L_{SUB}$, in particular by at least one order of magnitude: $L_{SUB}/T_{SUB}>10$. For instance, in one embodiment $L_{SUB}=30$ mm, $T_{SUB}=1$ mm, and $L_{SUB}/T_{SUB}=30$.

The substrate 2 has a recess 5 having a substantially parallelepipedal shape delimited by a frame portion 2c of the substrate 2 itself and open on the first face 2a. The recess 5 houses the sensor chip 3. In greater detail, the sensor chip 3 is bonded to a bottom wall of the recess 5 by a rigid attach layer or hard die-attach layer 6. The type of attachment is selected so as to guarantee continuity of the mechanical stresses between the substrate 2 and the sensor chip 3. In one embodiment, the hard die-attach layer 6 may be obtained by diffusion soldering with an AuSn eutectic alloy.

The sensor chip 3 is a thin chip, having a thickness $T_{CHIP}$ that is at least one order of magnitude smaller than the thickness $T_{SUB}$ of the substrate 2, so that $T_{SUB}/T_{CHIP}>10$. Advantageously, the lateral dimensions of the stress sensor may be comparable with the maximum dimensions of the aggregates contained in the viscoelastic material (for example, concrete) of the structure to be monitored. For instance, the main dimension $L_{SUB}$ of the substrate 2 may be in the range 20 mm-50 mm. In one embodiment, further, the frame portion 2c has a width $L_F$ defined by the distance between the walls of the recess 5 and the corresponding outer edges of the substrate 2. Advantageously, the width $L_F$ of the frame portion 2c may be equal to the thickness $T_{SUB}$ of the substrate 2 or greater. In this way, the parts of the stress sensor 1 that are subject to a high stress gradient (edges and corners) are sufficiently far from the sensitive area, where the sensor chip 3 is housed. For instance, lateral dimensions $L_{CHIP}$ of the sensor chip 3 may be greater than 3 mm. In addition, the thickness $T_{CHIP}$ of the sensor chip 3 and the thickness $T_{DA}$ of the hard die-attach layer 6 (which are normally of some microns) are as a whole smaller than a depth D of the recess 5. For instance, the thickness $T_{CHIP}$ of the sensor chip 3 is 80 μm, the thickness $T_{DA}$ of the hard die-attach layer 6 is 1.2 μm, and the depth D of the recess 5 is 100 μm. In this way, the sensor chip 3 is entirely housed in the recess 5 and does not project from the first face 2a of the substrate 2. The dimensions of the sensor chip 3 in a direction transverse to the thickness $T_{CHIP}$ are slightly smaller than the corresponding dimensions of the recess 5 so that a gap 7 is present between the sensor chip 3 and the side walls of the recess 5. In one embodiment, the gap 7 has a width $L_G$ and is filled with a relatively soft filler material 8 having a Young's modulus lower than that of the substrate 2 and the sensor chip 3. For instance, the filler material may be an epoxy resin, having a Young's modulus of 16 GPa and a Poisson's modulus of 0.38. The filler material 8 may coat the surface of the sensor chip 3.

Figure 3:
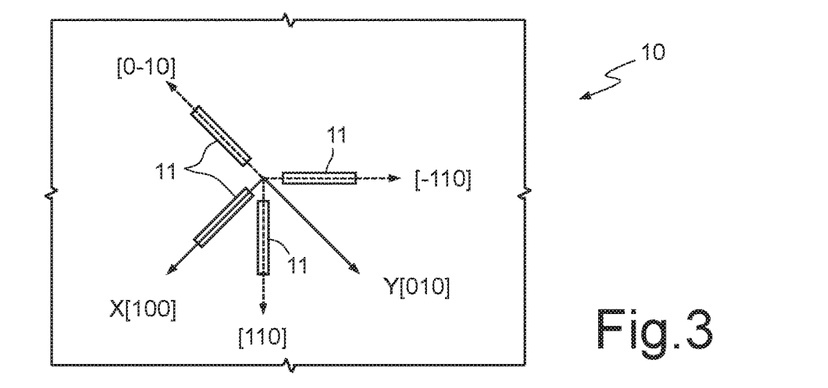
FIG. 3 is an enlarged detail of the stress sensor of FIG. 1.

Sensing cells 10 are arranged on the sensor chip 3. In the embodiment of FIGS. 1 and 2, the sensing cells 10 are distributed, for example arranged in an array, over the surface of the sensor chip 3 in order to average possible stress gradients due to the granularity of the concrete. As illustrated in greater detail in FIG. 3, a sensing cell 10 comprises a plurality of sensing components 11, for example defined by strips of piezoresistive material deposited on the sensor chip 3. Advantageously, the sensing components 11 present an anisotropic behavior and are oriented according to respective crystallographic axes of the semiconductor material forming the sensor chip 3. In one embodiment, in particular, the sensing components 11 are oriented so as to detect the normal and shear out-of-plane stresses. The configuration of the sensing components 11 that is illustrated in FIG. 3 is, however, provided by way of example and is not to be considered as being in any way limiting. Furthermore, the sensing cells 10 of the sensor chip 3 may all have the same structure or structures different from one another. In one embodiment (not illustrated), even just one sensing cell 10 may be present.

Through connection lines 12 and an interface circuit 15 embedded in the substrate 2, the sensing components 11 are coupled to a connector 13 for wired connection with the outside.

The stress sensor 1, embedded in a viscoelastic material such as concrete, is subject to high-intensity and high-gradient stresses that are variable in time. However, given the substantially planar shape and the high stiffness of the substrate 2, the normal and tangential out-of-plane stresses in the central part of the substrate 2 itself, which corresponds approximately to the recess 5 where the sensor chip 3 is housed, are relatively uniform and only marginally affected by phenomena of contraction, expansion, and creep of the viscoelastic material. Further, the frame portion 2c of the substrate 2, which surrounds the recess 5, and the gap 7 full of filler material 8 contribute to limiting the region of the sensor chip 3 subjected to marked stress gradients. In particular, the gap 7 and the filler material 8, with low Young's modulus, enable a decoupling of the lateral force between the substrate 2 and the sensor chip 3. This decoupling is all the more effective, the shorter the distance between the vertical walls delimiting the recess 5 and the adjacent walls of the sensor chip 3, i.e., the width $L_G$ of the gap 7. Advantageously, in one embodiment, the width $L_G$ of the gap 7 is of the same order of magnitude as the thickness $T_{CHIP}$ of the sensor chip 3. In effect, in this way, only a peripheral portion of the sensor chip 3 is affected by the stresses independent of the load applied, whereas in the central portion, where the sensing cells 10 are located, the normal and shear out-of-plane stresses are sufficiently uniform and basically determined by the load applied to the structure in which the stress sensor 1 is embedded. Other elements that contribute to determining uniform stresses on the internal portion of the sensor chip 3 and thus reliable measurements are:

the dimensions of the sensor chip 3, which is thin (width much greater than the thickness);

the smaller thickness of the stack formed by the sensor chip 3 and by the hard die-attach layer 6 as compared to the depth D of the recess 5, so that the sensor chip 3 does not project from the recess 5 with respect to the first face 2a of the substrate 2; and the stiffnesses of the substrate 2, of the sensor chip 3, and of the hard die-attach layer 6, which are similar to one another.

The substrate 2, the sensor chip 3, and the hard die-attach layer 6 provide a continuous mechanical system that is subjected to internal stresses that are similar to one another and is only slightly affected by the latter thanks to the modest overall thickness.

Figure 4:
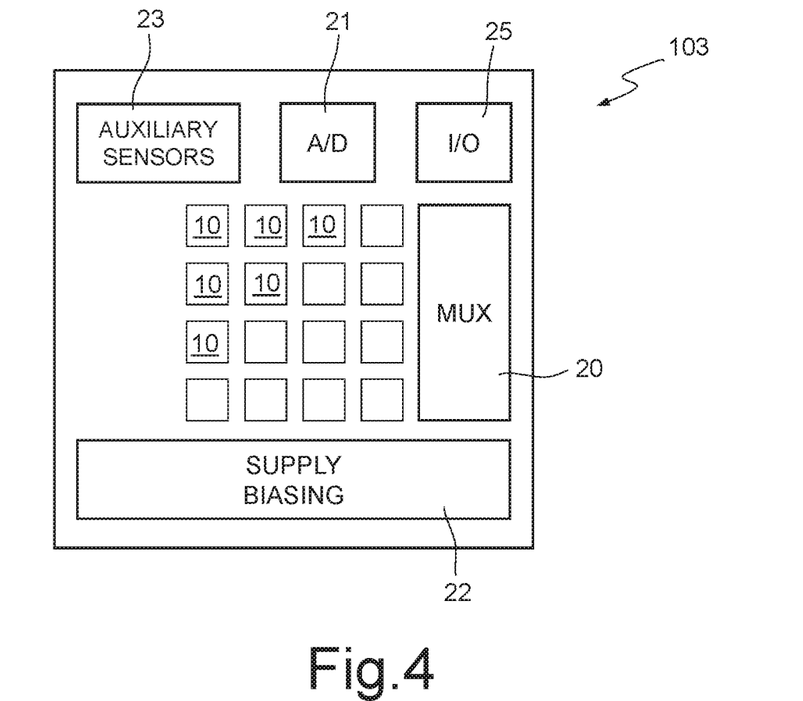
FIG. 4 is a top plan view of a component of a stress sensor according to a different embodiment of the present disclosure.

In one embodiment (illustrated in FIG. 4), the sensor chip, here designated by 103, houses sensing cells 10 of the type already described and, further, management and control circuits such as multiplexers 20 for selective access to the sensing cells 10, A/D converters 21, supply and biasing circuits 22, auxiliary sensors 23 (temperature sensors, humidity sensors, etc.), and input/output interfaces 25. The management and control circuits may be integrated in a peripheral portion of the sensor chip 103 around the sensing cells 10.

Figure 5:
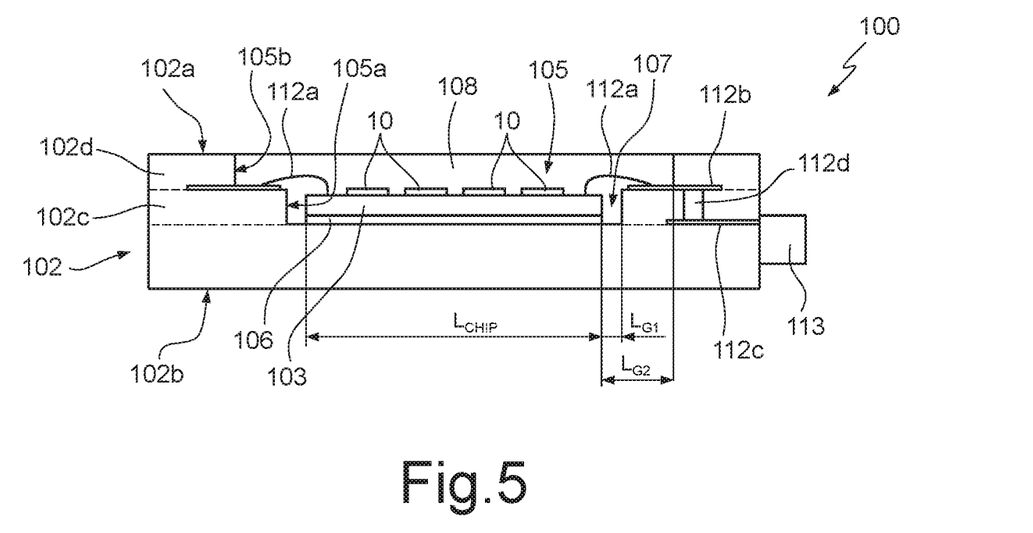
FIG. 5 is a cross-sectional view through a stress sensor according to a further embodiment of the present disclosure.

In the embodiment illustrated in FIG. 5, the sensor chip 103 is used in a stress sensor 100, which comprises a substrate 102 having a first face 102a and a second face 102b. More precisely, the sensor chip 103 is housed on the bottom wall of a recess 105 in the substrate 102 by a hard die-attach layer 106. The recess 105 has a first portion 105a, deeper and narrower, where the sensor chip 103 is housed, and a second portion 105b, shallower and wider. The first portion 105a and the second portion 105b of the recess 105 are delimited, respectively, by a first frame portion 102c and a second frame portion 102d of the substrate 102. The first portion 105a of the recess 105, in practice, is provided in a bottom wall of the second portion 105b and has a depth greater than the thickness of the stack formed by the sensor chip 103 and by the hard die-attach layer 106. The recess 105 thus has a step-like profile descending from the periphery towards the center. Furthermore, a gap 107 is defined between the sensor chip 103 and the first frame portion 102c of the substrate 102. In one embodiment, the gap 107 has a first width $L_{G1}$ that is of the same order of magnitude as that of a stack formed by the sensor chip 103 and by the hard die-attach layer 106. A second width $L_{G2}$, defined by a distance between the sensor chip 103 and the second frame portion 102d of the substrate 102 in a plane parallel to the faces 102a, 102b of the substrate 102 itself is of the same order of magnitude as a main dimension $L_{CHIP}$ of the sensor chip 103.

Figure 15:
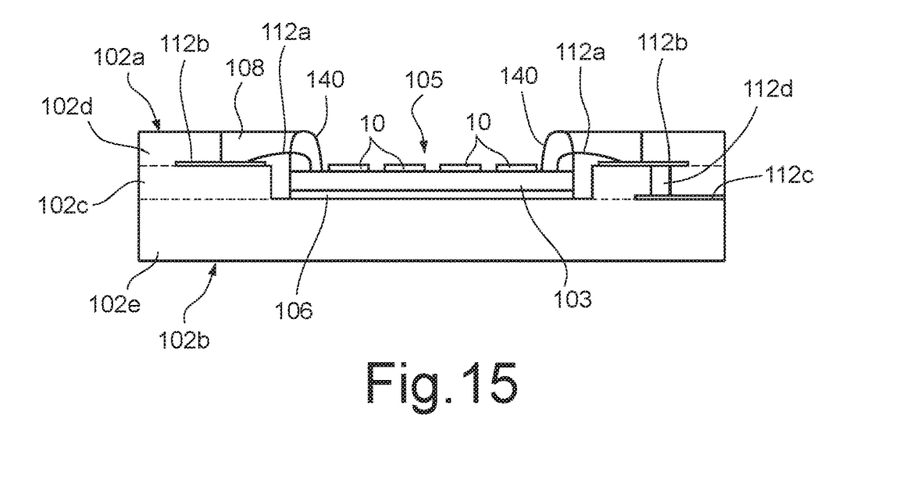

The sensing cells 10 and the management circuits are coupled to a connector 113 for wired connection with the outside through wire bonds 112a and first and second connection lines 112b, 112c. The first connection lines 112b run between the first frame portion 102c and the second frame portion 102d of the substrate 102, whereas the second connection lines 112c run between the second frame portion 102d and the portion of the substrate 102 defined between the second face 102b and the bottom wall of the recess 105. In one embodiment, the first connection lines 112b and the second connection lines 112c are connected to one another by a conductive via 112d that traverses the second frame portion 102d. The wire bonds 112a are embedded in a filler material 108 that fills the recess 105. In one embodiment (FIG. 15), the filler material may leave the sensing cells 10 of the sensor chip 103 exposed. The shape and overall depth of the recess 105 enable protection of surface structures of the sensor chip 103, such as the wire bonds 112a, without affecting the precision and the overall performance of the device.

Figure 6:
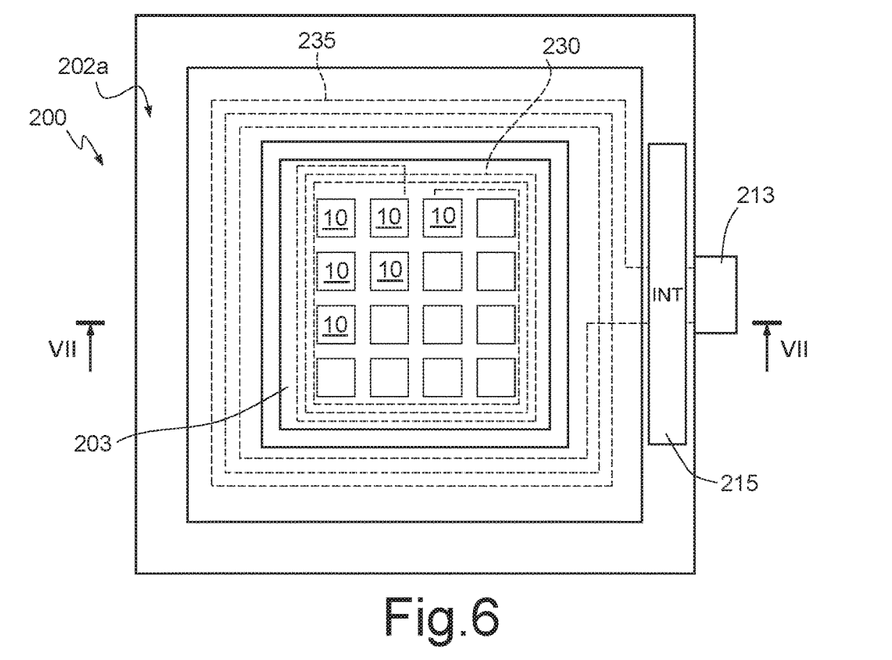
FIG. 6 is a top plan view of a stress sensor according to yet a further embodiment of the present disclosure.
Figure 7:
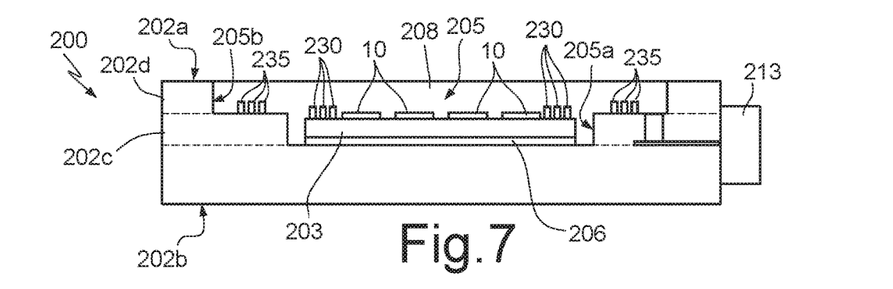
FIG. 7 is a cross-sectional view through the stress sensor of FIG. 6, taken along the line VII-VII of FIG. 6.

With reference to FIGS. 6 and 7, in one embodiment, a stress sensor 200 comprises a substrate 202 and a sensor chip 203. The substrate 202 has a first face 202a and a second face 202b, and has a recess 205 open on the first face 202. The sensor chip 203 is housed on the bottom wall of the recess 205 of the substrate 102 by a hard die-attach layer 206. The recess 205 has a first portion 205a, deeper and narrower, where the sensor chip 203 is housed, and a second portion 205b, shallower and wider. The first portion 205a and the second portion 205b of the recess 205 are delimited, respectively, by a first frame portion 202c and a second frame portion 202d of the substrate 202. The first portion 205a of the recess 205, in practice, is provided in a bottom wall of the second portion 205b and has a depth greater than the thickness of the stack formed by the sensor chip 203 and the hard die-attach layer 206. The recess 205 thus has a step-like profile descending from the periphery towards the center.

The sensor chip 203 comprises sensing cells 10 of the type already described with reference to FIG. 3 and is coupled in communication with the outside through a radiofrequency wireless connection. In greater detail, a first antenna 230, defined by a conductive line wound in a spiral, is provided on a peripheral portion of the sensor chip 203 around a region occupied by the sensing cells 10 and without overlapping the latter. The connection of the first antenna 230 with the sensing cells 10 is not illustrated for simplicity.

A second antenna 235 is provided on the substrate 202 and is connected, through an interface circuit 215, to a connector 213 for wired connection with the outside. In one embodiment, the second antenna 235 is defined by a conductive line wound in a spiral around the sensor chip 203 and extends, for example, on the first frame portion 202c. The second antenna 235 could be provided also on the first face 202a of the substrate 202.

A filler material 208 fills the recess 205, advantageously coating the sensor chip 203, the first antennas 230, and the second antennas 235. In one embodiment (not illustrated), the filler material may leave the sensing cells 10 of the sensor chip 203 and, possibly, the first antenna 230 exposed.

Figure 8:
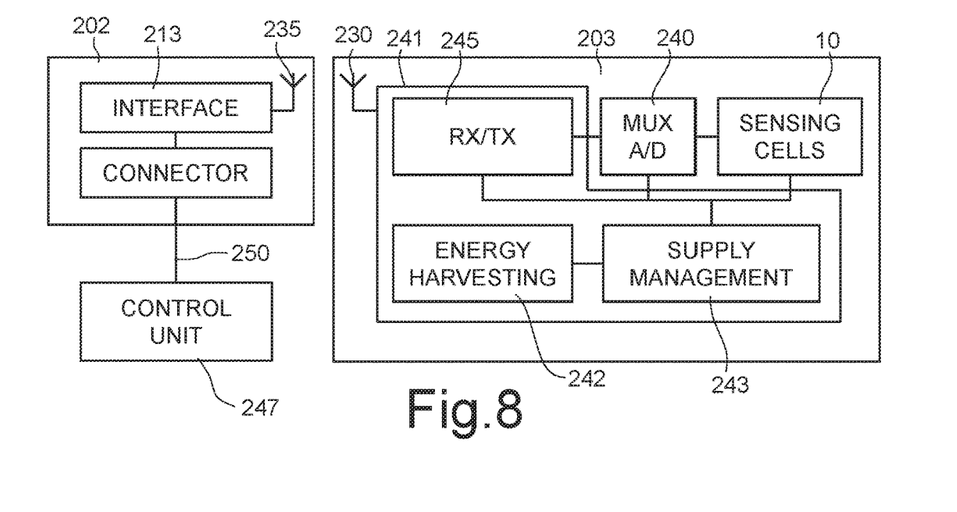
FIG. 8 is a simplified block diagram of the stress sensor of FIG. 6.

As illustrated schematically in FIG. 8, the sensor chip 203 is equipped with multiplexing and ADC circuits 240 and an interface 241, which, in turn, comprises an energy harvesting device 242, a supply management module 243, and a radiofrequency receiver/transmitter module 245. The multiplexing and ADC circuits 240 and the interface 241 may be integrated in the peripheral portion of the sensor chip 203 around the sensing cells 10, substantially as in the case of the sensor chip 103 of FIG. 4.

Through the first antenna 230, the second antenna 235, the interface circuit 215, the connector 213, and a wired connection line 250, the interface 241 is coupled to an external control unit 247, which operates also as device for reading the sensing cells 10 and, in one embodiment, also for individually reading the sensing components 11.

Figure 9:
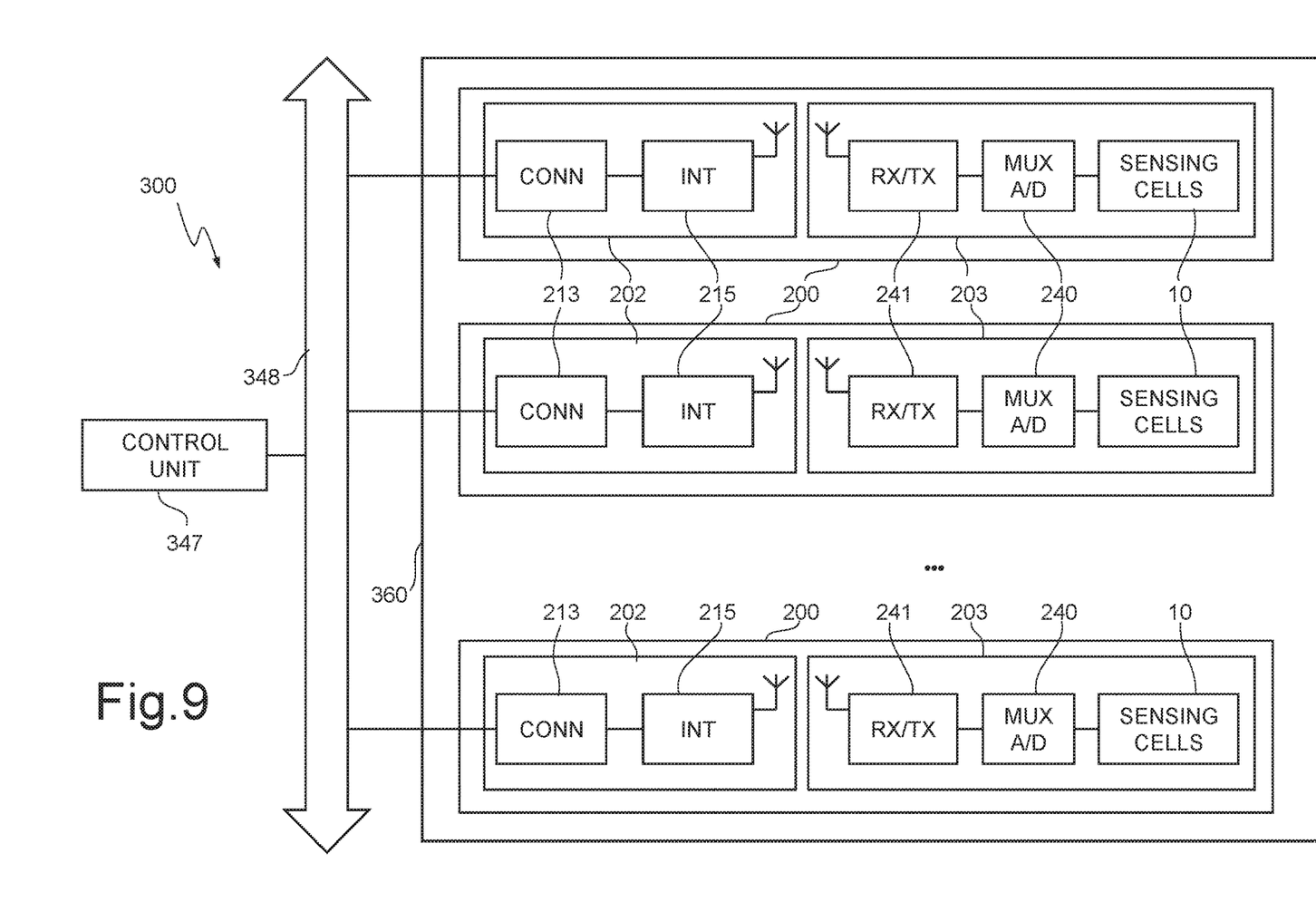
FIG. 9 is a simplified block diagram of a structural health monitoring system for constructions according to one embodiment of the present disclosure.
Figure 10:
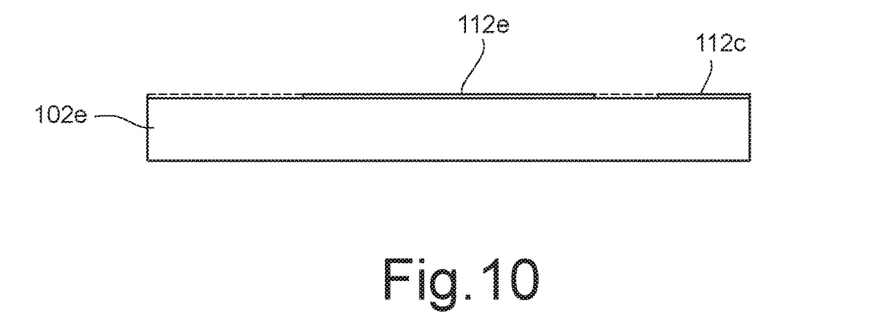
FIGS. 10-12 are cross-sectional views through a substrate of a stress sensor in successive steps of a process for manufacturing a stress sensor according to one embodiment of the present disclosure.

FIG. 9 shows an SHM system, designated as a whole by 300 and comprising a plurality of stress sensors 200 of the type illustrated in FIG. 7. The SHM system 300 further comprises a control unit 347, which operates also as reading device, and a communication bus 348. The stress sensors 200 are embedded in a structure 360 to be monitored, for example of concrete, and are connected to the communication bus 348 through the respective wired connection lines 250.

The control unit 347 is in turn connected to the communication bus 348 and is provided with reception and transmission functions and with functions for management of protocols for communication with the individual stress sensors 200 and, possibly, with the individual sensing cells 10 of each stress sensor 200.

FIGS. 10-15 illustrate an example of a process for manufacturing a stress sensor according to the present disclosure. The process described herein is based on the use of LTCC (Low-Temperature Co-fired Ceramic) technology, which makes it possible to provide multilayer boards by laminating thin ceramic layers, having a thickness in the region of 100 μm or less. The process may be used for any of the embodiments of the stress sensor so far described and, in particular, will be illustrated hereinafter in relation to the stress sensor 100 of FIG. 5.

Initially (FIG. 10), a ceramic base 102e, for example of a thickness of 2 mm, is made. A conductive layer, for example of copper, is laminated and defined on the ceramic base 102e, to form the second connection lines 112c and a pad 112e for attachment of the sensor chip 103.

Figure 11:
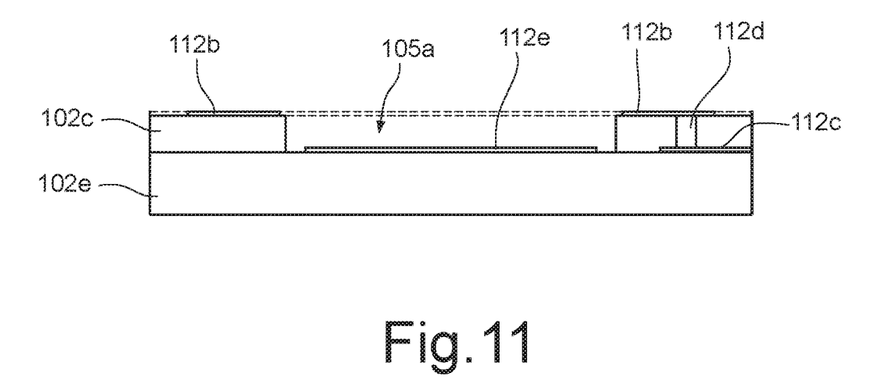

Next, a ceramic layer is laminated and defined to form the first frame portion 102c (FIG. 11). Definition enables opening of the first portion 105a of the recess 105 and, further, of a through hole, which is filled with conductive material to form the conductive via 112d. A further conductive layer is laminated and shaped to form the first connection lines 112b.

Figure 12:
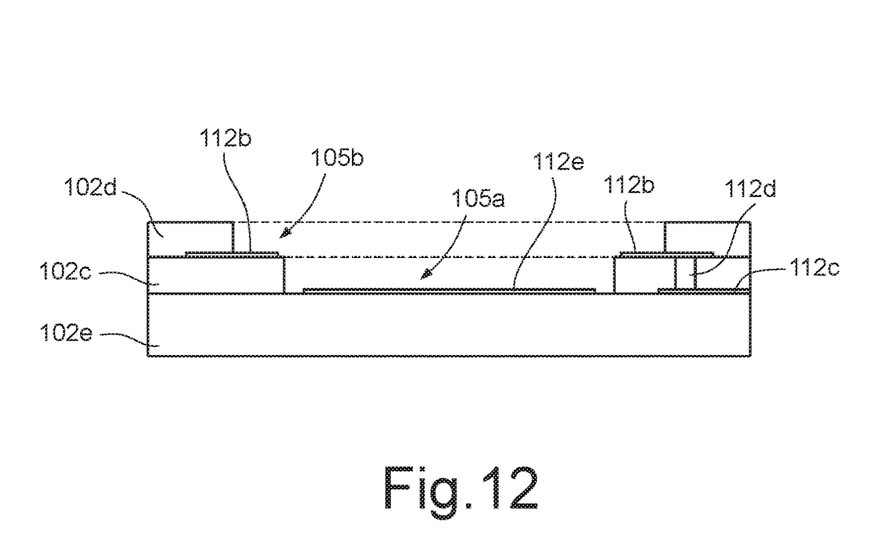
Figure 13:
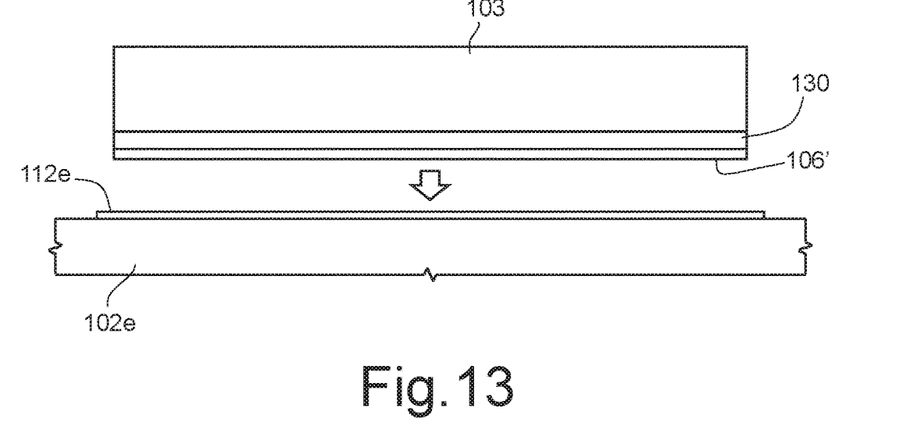
FIG. 13 is an enlarged cross-sectional view of the substrate of FIG. 10 and of a sensor chip of the stress sensor.

The second frame portion 102d, having, for example, a thickness of 220 µm, is then laminated and shaped to complete the substrate 102 and the recess 105 with its second portion 105b (FIG. 12).

Figure 14:
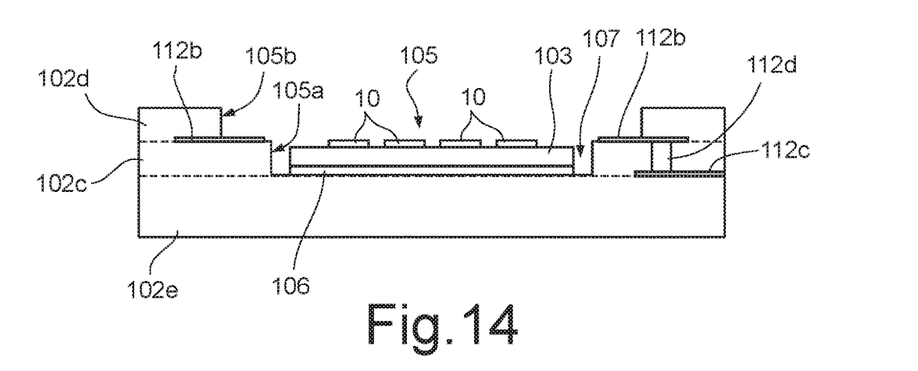
FIGS. 14 and 15 are cross-sectional views through the stress sensor in final steps of the manufacturing process according to the present disclosure.

The sensor chip 103 is then fixed to the pad 112e using a rigid attach technique. In particular (FIG. 13), a face of the sensor chip 103, designed in use to be fixed to the substrate 102, is coated with an interface layer 130, for example a TiAl alloy, and with a solder layer 106'. The solder layer 106', which has a surface free for coupling to the pad 112e, is an AuSn eutectic alloy, for example an Au80Sn20 alloy. The sensor chip 103 is placed on the pad 112e with the solder layer 106' in contact with the pad 112e itself, and a diffusion soldering is carried out, in which part of the copper forming the pad 112e diffuses into the solder layer 106'. The hard die-attach layer 106 is thus obtained, which in this case is an Au2Sn6Cu2 alloy having a thickness of, for example, 1.2 µm (FIG. 14).

Finally, the wire bonds 112a are made, and the recess 105 is filled with the filler material 8, thus obtaining the structure of FIG. 5.

Alternatively (FIG. 15), a so-called "dam and fill" technique may be used to keep the portion of the sensor chip 103 housing the sensing cells 10 exposed. After the wire bonds 112a have been made, a dam structure 140 is formed along the perimeter of the sensor chip 103 using a first low-viscosity epoxy resin. The dam structure 140 is shaped like a frame, extends around the region of the sensor chip 103 housing the sensing cells 10, and in part incorporates the wire bonds 112a. Next, the portion of the recess 105 around the sensor chip 103 and the dam structure 140 is filled with the filler material 108, whereas the region inside the dam structure 140 remains free. The filler material 108 may be a second, high-viscosity, epoxy resin.

In addition to the advantages already illustrated in the course of the foregoing description, other advantages of the disclosure are described in what follows. The stress sensors embedded in a structure of viscoelastic material enable precise measurement of loads applied to the structure itself, with any orientation. Also the stress sensors may be oriented in any way within the structure.

The use of semiconductor chips enables integration of piezoresistive sensing components having high sensitivity. In addition, the use of a plurality of sensing components distributed over one or more sensor chips makes it possible to carry out a spatial averaging of the stresses measured, mitigating the effects of the granularity of the viscoelastic material and of discontinuities due to the possible presence of aggregates and bubbles.

Connection with the outside and reading of the signals produced by the sensing components of the stress sensors are easy and do not involve complex procedures or specific skills (as is, instead, the case of fiber-optic sensors).

The sensors are of small size and, especially as regards their thickness, do not appreciably affect the characteristics of the structure of viscoelastic material in which the sensors themselves are embedded.

The simplicity of construction and low cost both from the standpoint of production and from the standpoint of the management and reading equipment enable use of a large number of sensors arranged in a network for monitoring extensive structures with high spatial resolution.

Finally, it is evident that modifications and variations may be made to the electronic device and to the method described, without thereby departing from the scope of the present disclosure.

For instance, the stress sensor may be equipped with a plurality of sensor chips, housed adjacent to one another in a same recess or in separate recesses in the substrate. Each sensor chip may be equipped with sensing components, as has been described, possibly arranged in cells. The sensor chips may be different from one another as regards size and arrangement of the sensing components.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A stress sensor, comprising:
   a substrate, having a face and a recess, which is open on the face; and
   a sensor chip of semiconductor material, housed in the recess and fixed to the substrate, the sensor chip being provided with a plurality of sensing components of piezoresistive material, wherein:
      the substrate has a thickness smaller by at least one order of magnitude than a main dimension of the face;
      the sensor chip has a thickness smaller by at least one order of magnitude than the thickness of the substrate;
      the substrate and sensor chip have respective Young's moduli of a same order of magnitude; and
      the substrate includes a frame portion that delimits the recess and is separated from the sensor chip by a gap.

2. The sensor according to claim 1, wherein the substrate is of a ceramic material, the sensor further comprising a hard die-attach layer that bonds the sensor chip to the substrate.

3. The sensor according to claim 2, wherein the hard die-attach layer is a diffusion solder layer based upon an AuSn eutectic alloy.

4. The sensor according to claim 2, wherein a sum of the thickness of the sensor chip and of a thickness of the hard die-attach layer is less than a depth of the recess.

5. The sensor according to claim 1, further comprising a hard die-attach layer that bonds the sensor chip to the substrate and forms a stack with the sensor chip, wherein the gap has a width that is of a same order of magnitude as a thickness of the stack.

6. The sensor according to claim 5, further comprising a filler material filling the gap, the filler material having a Young's modulus lower than the Young's modulus of the substrate and the Young's modulus of the sensor chip.

7. The sensor according to claim 1, wherein the sensing components are oriented according to respective crystallographic axes of the semiconductor material forming the sensor chip.

8. The sensor according to claim 1, further comprising a hard die-attach layer that bonds the sensor chip to the substrate and forms a stack with the sensor chip, wherein:
   the recess has a first portion and a second portion, the first portion being deeper and narrower than the second portion and housing the sensor chip;

the first portion of the recess is provided in a bottom wall of the second portion of the recess and has a depth greater than a thickness of the stack formed by the sensor chip and by the hard die-attach layer; and:
a distance between vertical faces of the sensor chip and of the second portion is of a same order of magnitude as a main dimension of the sensor chip.

9. The sensor according to claim 1, further comprising management and control circuits integrated in the sensor chip.

10. The sensor according to claim 1, further comprising:
an interface circuit positioned in the substrate;
conductive interconnection elements positioned in the substrate;
a plurality of wire interconnection elements between the sensor chip and the substrate; and
a connector attached to the substrate and connected to the conductive interconnection elements.

11. The sensor according to claim 1, comprising:
a first antenna on the sensor chip;
a second antenna provided on the substrate; and
a connector coupled to the second antenna and configured for a wired connection with an external device, the first antenna and the second antenna being configured for mutual radiofrequency communication.

12. The sensor according to claim 11, wherein the first antenna includes a first conductive line wound in a spiral and provided on a peripheral portion of the sensor chip around a region occupied by the sensing components; and wherein the second antenna includes a second conductive line wound in a spiral around the sensor chip.

13. The sensor according to claim 11, wherein an energy harvesting device, a supply management module and a radiofrequency receiver/transmitter module are integrated in the sensor chip.

14. The sensor according to claim 1, wherein the sensor is coupled to a control unit and is configured to be embedded in a structure of a viscoelastic material.

15. The sensor according to claim 14, wherein the Young's modulus of the substrate and the Young's modulus of the sensor chip are both higher than a Young's modulus of the viscoelastic material forming the structure to be monitored.

16. A method for manufacturing a stress sensor, comprising:
forming a substrate having a face and a recess that is open on the face, the forming the substrate including forming a frame portion on a ceramic base, the frame portion delimiting the recess, the frame portion and the ceramic base being of a same ceramic material;
housing a sensor chip in the recess, the sensor chip being provided with a plurality of sensing components of piezoresistive material; and
affixing the sensor chip to the substrate, wherein:
the substrate has a thickness smaller by at least one order of magnitude than a main dimension of the face;
the sensor chip has a thickness smaller by at least one order of magnitude than the thickness of the substrate; and
the substrate and the sensor chip having respective Young's moduli of a same order of magnitude.

17. The method according to claim 16, wherein affixing comprises:
forming a pad of a conductive material on the ceramic base;
covering a face of the sensor chip with a solder layer of a eutectic alloy;
placing the sensor chip on the pad with the solder layer in contact with the pad; and
carrying out a diffusion soldering.

18. The method according to claim 17, wherein the conductive material forming the pad is copper, and the eutectic alloy is an AuSn alloy.

19. A stress sensor, comprising:
a substrate, having a face and a recess, which is open on the face;
a sensor chip of semiconductor material, housed in the recess and fixed to the substrate, the sensor chip being provided with a plurality of sensing components of piezoresistive material; and
a hard die-attach layer that bonds the sensor chip to the substrate and forms a stack with the sensor chip, wherein:
the substrate has a thickness smaller by at least one order of magnitude than a main dimension of the face;
the sensor chip has a thickness smaller by at least one order of magnitude than the thickness of the substrate;
the substrate and sensor chip have respective Young's moduli of a same order of magnitude;
the recess has a first portion and a second portion, the first portion being deeper and narrower than the second portion and housing the sensor chip;
the first portion of the recess is provided in a bottom wall of the second portion of the recess and has a depth greater than a thickness of the stack formed by the sensor chip and by the hard die-attach layer; and
a distance between a vertical face of the sensor chip and a vertical face of the second portion is of a same order of magnitude as a main dimension of the sensor chip.

20. The sensor according to claim 19, wherein the substrate is of a ceramic material.

21. The sensor according to claim 19, wherein the sensing components are oriented according to respective crystallographic axes of the semiconductor material forming the sensor chip.

22. A stress sensor, comprising:
a substrate, having a face and a recess, which is open on the face;
a sensor chip of semiconductor material, housed in the recess and fixed to the substrate, the sensor chip being provided with a plurality of sensing components of piezoresistive material;
a first antenna on the sensor chip;
a second antenna provided on the substrate; and
a connector coupled to the second antenna and configured for a wired connection with an external device, the first antenna and the second antenna being configured for mutual radiofrequency communication,
wherein:
the substrate has a thickness smaller by at least one order of magnitude than a main dimension of the face;
the sensor chip has a thickness smaller by at least one order of magnitude than the thickness of the substrate; and
the substrate and the sensor chip have respective Young's moduli of a same order of magnitude.

* * * * *